United States Patent
Niestrat et al.

(10) Patent No.: US 10,574,034 B2
(45) Date of Patent: Feb. 25, 2020

(54) LOCKING MECHANISM FOR AN ELECTRICAL ASSEMBLY, AND ASSEMBLY COMPRISING A LOCKING MECHANISM

(71) Applicant: HORA eTec GmbH, Bünde (DE)

(72) Inventors: Dirk Niestrat, Löhne (DE); Ralf Holtmann, Bünde (DE)

(73) Assignee: HORA ETEC GMBH, Bünde (DE)

( * ) Notice: Subject to any disclaimer, the term of this patent is extended or adjusted under 35 U.S.C. 154(b) by 0 days.

(21) Appl. No.: 16/070,518

(22) PCT Filed: Jan. 22, 2017

(86) PCT No.: PCT/EP2017/051261
§ 371 (c)(1),
(2) Date: Jul. 16, 2018

(87) PCT Pub. No.: WO2017/129499
PCT Pub. Date: Aug. 3, 2017

(65) Prior Publication Data
US 2019/0027904 A1  Jan. 24, 2019

(30) Foreign Application Priority Data
Jan. 30, 2016  (DE) .................... 20 2016 100 467 U (51) Int. Cl.
*H02B 1/052* (2006.01)
*H01R 9/26* (2006.01)

(52) U.S. Cl.
CPC ......... *H02B 1/0523* (2013.01); *H01R 9/2608* (2013.01)

(58) Field of Classification Search
CPC ............................ H02B 1/0523; H01R 9/2608
See application file for complete search history.

(56) References Cited

U.S. PATENT DOCUMENTS 6,563,697 B1   5/2003   Simbeck et al.

FOREIGN PATENT DOCUMENTS

| DE | 29821558    | 3/1999 |
| DE | 69900250    | 6/2002 |
| DE | 102006030953| 3/2007 |
| DE | 202010013453| 11/2010|
| DE | 202014105219| 6/2015 |
| EP | 0602305     | 6/1994 |
| EP | 2498353     | 9/2012 |
| JP | H05198332   | 8/1993 |

OTHER PUBLICATIONS

International Search Report of Counterpart PCT International Application No. PCT/EP2017/051261.

*Primary Examiner* — Jayprakash N Gandhi
*Assistant Examiner* — Hung Q Dang
(74) *Attorney, Agent, or Firm* — Liu & Liu (57) ABSTRACT

A locking mechanism (20, 22) for an electrical assembly (10). The locking mechanism (20, 22) has a detent hook (20) that is hinged to the electrical assembly (10) by a flexible detent hook web (30), and a detent hook bracket (32) that is used for deflecting the detent hook (20). Limiting structures (34, 35, 36, 37, 38) restrict mobility of the buckle bracket (32) when the detent hook (20) is deflected. The locking mechanism (20, 22) may be applied in an electrical assembly, such as terminals, distribution terminals or other electrical connection devices, fuse holders, etc., as well as switching devices such as protectors, motor protection switches and the like.

11 Claims, 7 Drawing Sheets

LOCKING MECHANISM FOR AN ELECTRICAL ASSEMBLY, AND ASSEMBLY COMPRISING A LOCKING MECHANISM

BACKGROUND OF THE INVENTION

The invention relates primarily to a detent mechanism for an electrical assembly or an electrical device, collectively referred to below as an electrical assembly. Electrical assemblies are understood to mean terminals, distribution terminals, or other electrical connection devices, fuse holders, etc., as well as switching devices such as protectors, motor protection switches, and the like. Moreover, the invention relates to such an electrical assembly having a detent mechanism.

With these types of assemblies, mounting in a terminal box, distribution box, or a so-called switch cabinet is common. The mounting takes place on or at a support rail or mounting rail provided for this purpose. Such rails have a profile that is provided for detachably mounting (snapping on, snapping off) an assembly or a plurality of assemblies. One example of such a profile is a so-called top-hat profile of a corresponding support rail, referred to as a top-hat profile rail, or top-hat rail for short.

The mounting in each case of an assembly on or at such a support rail takes place by means of a detent profile that is included in the particular assembly, and a detent mechanism that is also included in the assembly. The detent profile is situated on a bottom side of the assembly, and typically includes a fixed detent profile on one side, for example in the form of at least one rigid detent hook, at a distance that is set to the width of the particular support rail, and on an opposite side, an elastic detent profile, for example in the form of at least one elastic detent hook. This type of detent profile is described in DE 20 2010 005 216 U1 titled "Electrical connection device."

Although the detent profile from DE 20 2010 005 216 U1 has proven suitable in practice, there is still potential for improvement.

SUMMARY OR THE INVENTION

Accordingly, an object of the present invention is to provide a further embodiment of a detent profile, in particular a further embodiment of a detent mechanism of such a detent profile.

This object is achieved according to the invention by means of a detent mechanism of the type mentioned at the outset having the features of claim 1. To this end, in a detent mechanism for an electrical assembly it is provided that the detent mechanism comprises a detent hook, and a detent hook bracket that is intended for deflecting the detent hook. In addition, the detent hook is hinged to a side face of the assembly, usually the bottom side, by means of an elastically movable detent hook web. Due to the elastically movable detent hook web, the detent hook itself is thus elastically movable, and in the following discussion is referred to as a movable detent hook to distinguish it from at least one oppositely situated rigid detent hook. The detent mechanism is characterized in that limiting means limit movability of the detent hook bracket when the detent hook is deflected.

In DE 20 2010 005 216 U1, an elastic detent hook functions as a detent mechanism. In order to fix an assembly that is equipped with such a detent mechanism to a support rail, the assembly is suspended on one side of the support rail and snapped onto same by subsequently pivoting the assembly in the direction of the support rail. In the process, the elastic detent hook, within the scope of its material elasticity, is deflected upon contact with the support rail. In the fully pivoted state of the assembly, the detent hook springs back into its original position, and with its hook-shaped contour (detent lug) engages beneath a section of the support rail. For removal of an assembly that is snapped onto a support rail and that is equipped with such a detent mechanism, the elastic detent hook is deflected by means of a tool, typically a screwdriver, so that the detent lug of the detent hook disengages from the support rail, whereupon the assembly may be removed from the support rail.

The elastic property of such a detent hook results from a detent hook web that is connected to a housing of the particular assembly, in particular connected in one piece, and the material properties of the detent hook web. Housings of the assemblies under discussion are customarily made of a plastic, and correspondingly, the detent hook web that functions as a connection of the detent hook to the housing (detent hook connection) is also customarily made of a plastic. An elastic property of the detent hook web results within the scope of the material properties of the particular plastic used. However, if excessive force is applied, such a detent hook web may even break in whole or in part, so that when a detent hook web is torn off, locking of the particular assembly to a support rail is no longer possible, and with a partially broken or overloaded detent hook web the elastic property is often reduced so greatly that when the particular assembly is pivoted onto the support rail, the detent hook web no longer springs back into a configuration in which the detent lug situated at the end of the detent hook securely engages beneath the support rail.

The advantage of the detent mechanism proposed herein is that a detent hook bracket that is intended for deflecting the detent hook is guided by limiting means, and that this guiding of the detent hook bracket limits movability of the detent hook bracket when the detent hook is deflected, and thus also limits movability of the detent hook as a whole.

As a result of limiting the movability of the detent hook, it is not possible for the detent hook to be damaged or even torn off, even under excessive application of force. Also as a result of limiting the movability of the detent hook, the detent hook web is not overstressed (overstretched) when the detent hook is deflected, and thus maintains the elasticity provided within the scope of the particular material properties, even after numerous locking operations and subsequent releases of the detent connection. The detent mechanism is economical, since it may be manufactured from the material of the housing for the particular assembly and may be joined to the housing in one piece. In such an embodiment, the detent mechanism is an integral part of the housing of the particular assembly, and does not require an additional mounting step during manufacture of the assembly in question.

Advantageous embodiments of the detent mechanism are the subject matter of the subclaims. Back references that are used refer to the further development of the subject matter of the main claim by the features of the respective subclaim. They are not to be construed as a waiver of the attainment of independent subject matter protection for the feature combinations of the back-referenced subclaims. Furthermore, with regard to interpretation of the claims, in the event of a more precise specification of a feature in a subordinate claim, it is to be assumed that there is no such limitation in the respective preceding claims.

In one advantageous embodiment of the detent mechanism, the detent hook web is inclined, at least in sections. The inclination is with respect to a normal to the particular side face from which the detent hook web emerges, i.e., typically with respect to a normal to the bottom side of the assembly. The direction of inclination points away from the area between the movable detent hook and at least one oppositely situated rigid detent hook. The support rail is situated in this area when an assembly is snapped on. Accordingly, this direction of inclination is referred to below for short as an inclination facing away from the support rail. Better load capacity of the detent connection results due to the detent hook web being inclined, at least in sections, in this way. The improved load capacity is provided due to the fact that, for a tensile load that acts on an assembly that is snapped onto a support rail, the inclined detent hook web is increasingly raised up due to the tensile load. This raising results in improved and durable locking of the assembly to the support rail.

In previous detent mechanisms, a connection between the housing of the assembly and the movable detent hook, which may be understood as a detent hook web, is oriented perpendicularly with respect to the bottom side of the assembly. Such a detent hook web is stretched when a substantial tensile load acts on the assembly. This stretching is not uniform within the detent hook web, but, rather, is greatest on a side facing the, or each, rigid detent hook (the side facing the detent lug on the movable detent hook). This results in deformation of the detent hook web, which increases a distance between the detent lug on the movable detent hook and a corresponding detent contour on the, or each, oppositely situated rigid detent hook, so that the detent lug of the movable detent hook ultimately disengages from the support rail. The locking of the assembly to the support rail then no longer exists. For the inclined detent hook web according to the embodiment of the detent mechanism proposed here, with the inclination facing away from the support rail, a substantial tensile load acting on the assembly may possibly likewise result in stretching of the detent hook web, but at least also results in the detent hook web raising up from the previously inclined orientation. In the inclined orientation without load, a distance between the detent lug of the movable detent hook and a corresponding detent contour on the, or each, oppositely situated rigid detent hook is matched to the width of the support rail. When the detent hook web is raised up, it is pressed against the support rail. Increasing tensile load thus results in the detent hook being increasingly strongly laterally pressed against the support rail, so that the detent lug, in a manner of speaking, "digs in" beneath the support rail, and the detent lug in particular is not disengaged from the support rail.

As a result, the fixing of the particular assembly in the snapped-on state on the support is much more durable, in particular more durable against vibration loads, even extreme vibration loads, and more resistant to improper attempts to release the locking of the assembly to the support rail.

In another embodiment of the detent mechanism, at least one stop rib that is oriented transversely with respect to a longitudinal extension of the detent hook bracket acts as a limiting means. Due to the stop rib, the detent hook bracket is movable only up to the stop on the stop rib. This limitation of the movability of the detent hook bracket results in limitation of the deflectability of the detent hook and of the detent hook web. Accordingly, the at least one stop rib is an example of limitation of the movability of the elastically deformable detent hook web, which ensures that the detent hook web cannot be torn off, or overstressed in such a way that its elastic deformability and thus its elastic property is lost. The stop rib may be part of the detent hook bracket, and may strike against a contour provided for this purpose on the bottom side of the particular assembly. Alternatively, the stop rib may be part of the contour of the bottom side of the particular assembly, and may engage in a recess in the detent hook bracket and may strike against a side face of this recess in order to limit the movability of the detent hook bracket.

In a further or alternative embodiment of the detent mechanism, at least one pair of guide ribs that are placed above and below a plane defined by the detent hook bracket function as limiting means. The guide ribs ensure that the detent hook bracket is guided in a plane defined by the position of the guide ribs when the detent hook is deflected. As a result of the guide ribs themselves being mounted above and below the plane defined by the detent hook bracket, the detent hook bracket always remains in the same plane or at least essentially in the same plane when the detent hook is deflected. Thus, when the detent hook is deflected, the detent hook bracket cannot be pivoted out of the plane that is provided for a translational movement of the detent hook bracket, and, for example, cannot be raised up and thus bent or broken off. This ensures that the detent hook bracket is not damaged, even when the detent connection is released multiple times, and thus likewise ensures that the detent mechanism as a whole remains usable over a long period of time. In addition, the fixing of the detent hook bracket in the plane defined by the guide ribs simplifies operation of the detent mechanism when the detent connection is released, since, due to the guide ribs, the detent hook bracket is always situated slightly above a mounting plate or the like, for example, on which the particular support rail is mounted and to which the assembly is locked. At that location the detent hook bracket may be easily accessed with a tool, for example a screwdriver, for example by inserting the blade of the screwdriver into a recess provided for this purpose on the free end of the detent hook bracket. Without the fixing of the detent hook bracket in the plane defined by the guide ribs, after several actuation operations the detent hook bracket may be raised upwardly to some extent (away from a possible mounting plate) or pressed downwardly to rest on the mounting plate in the downwardly pressed state. At that location the blade of the screwdriver can be inserted into the recess at the end of the detent hook bracket only until contact is made with the mounting plate. This increases the risk of the blade of the screwdriver slipping off when the detent hook bracket moves. In addition, the mounting plate may be scratched by contact with the blade of the screwdriver.

In yet another embodiment of the detent mechanism, the detent hook bracket has a reduced-material section along its longitudinal extension. In the material-reduced section, the detent hook bracket is thinner than in the area laterally next to the material-reduced section. The material-reduced section ensures elastic movability of the detent hook bracket in this area, transversely with respect to the longitudinal extension thereof. When the detent hook is deflected, not only does elastic deformation of the detent hook take place in the area of its detent hook web, but also elastic deformation of the detent hook bracket takes place in the area of its material-reduced section. The detent hook bracket may thus optimally follow the pivoting motion of the detent hook web that is triggered when the detent hook bracket is actuated, in that the detent hook bracket becomes increasingly bent in the material-reduced section the more the detent hook web is pivoted. The portion adjoining the material-reduced section up to the free end of the detent hook bracket remains in its intended horizontal or essentially horizontal orientation.

Such a horizontal or essentially horizontal orientation of the detent hook bracket may be ensured particularly well when the material-reduced section of the detent hook bracket is situated between the detent hook and the limiting means or a limiting means.

Overall, the invention proposed herein is also an electrical assembly of the type mentioned at the outset, having a detent mechanism as described here and discussed below.

The claims filed with the present patent application are proposed formulations without prejudice to the attainment of further protection. Since in particular the subject matter of the subclaims, with regard to the prior art on the date of priority, may form separate, independent inventions, the applicant reserves the right to make these or even further feature combinations, heretofore disclosed only in the description and/or drawings, the subject matter of independent claims or declarations of division. Moreover, the subject matter of the subclaims may also include separate inventions that are independent from the subject matter of the preceding subclaims.

One exemplary embodiment of the detent mechanism according to the invention is explained in greater detail below with reference to the drawings. Mutually corresponding objects or elements are provided with the same reference numerals in all the figures.

The, or each, exemplary embodiment is not to be construed as limiting to the invention. Rather, within the scope of the present disclosure, alterations and modifications of the detent mechanism are also possible, in particular those variants, elements, and combinations and/or materials which, for example by combining or modifying individual features or elements or method steps described in conjunction with the general or specific portion of the description and contained in the claims and/or drawings, may be inferred by those skilled in the art with regard to achieving the object of the invention, and by means of combinable features, result in new subject matter or new method steps or method step sequences, also to the extent that they relate to manufacturing and operating methods.

DETAILED DESCRIPTION OF ILLUSTRATED EMBODIMENTS

Figure 1:
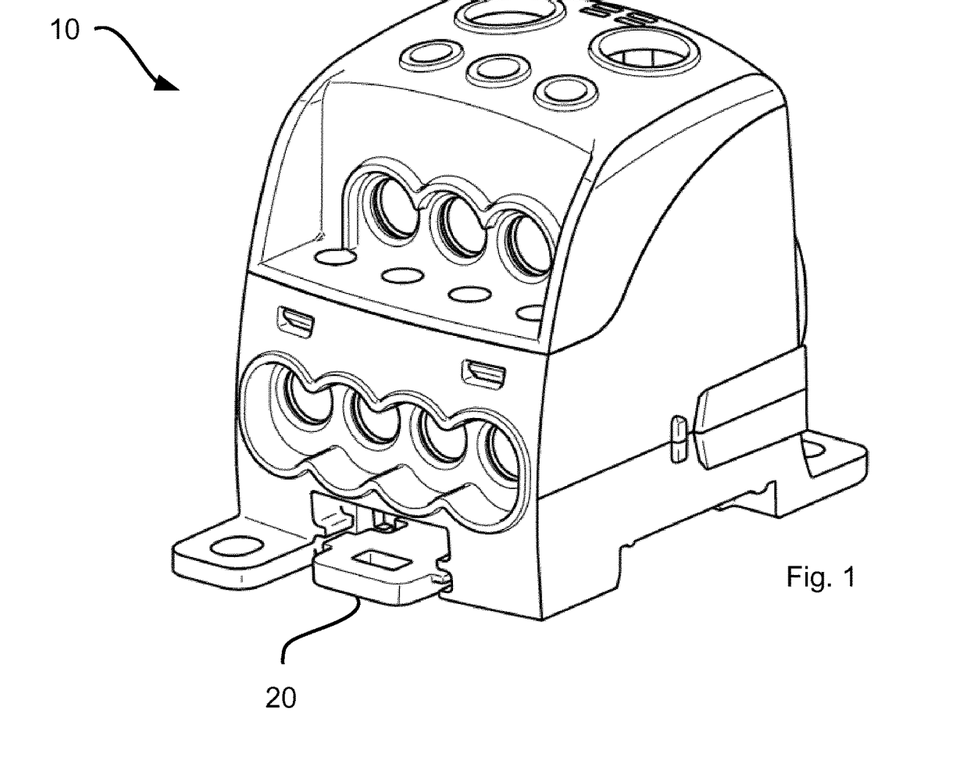
FIG. 1 shows an electrical assembly that is provided for snapping onto a support rail, in a perspective view.
Figure 2:
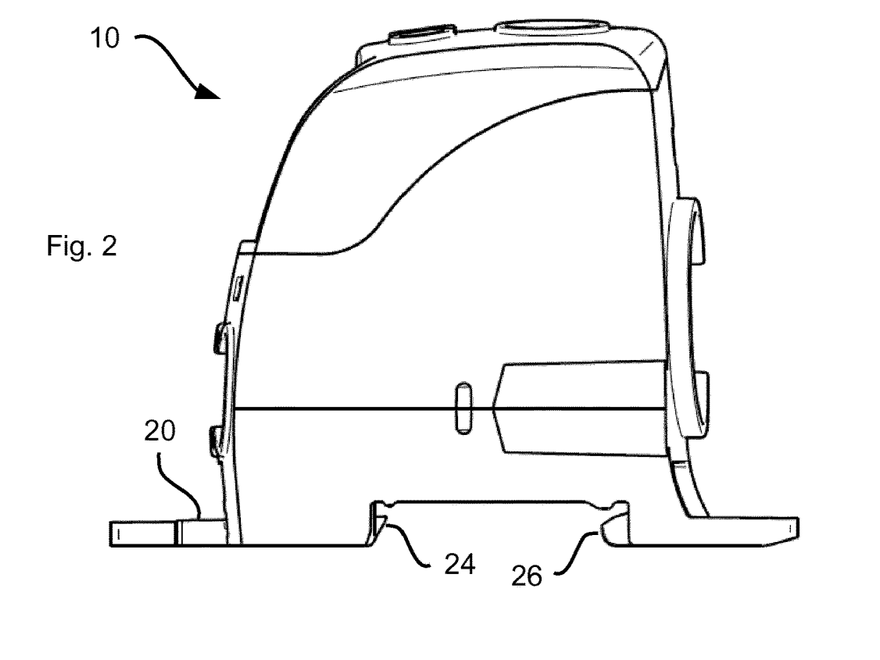
FIG. 2 shows the assembly according to FIG. 1 in a side view.

The illustrations in FIG. 1 and FIG. 2 show, as an example of an electrical assembly 10 of the type under discussion here, a distribution block/a distribution terminal similar to the distribution terminal described in DE 20 2010 005 216 U1. The illustrations in FIGS. 3A, 4A, and 5A correspond to the illustrations in FIGS. 3B, 4B, and 5B, with the reference lines and reference numerals omitted in the illustrations in FIGS. 3B, 4B, and 5B for better clarity.

Figure 3A:
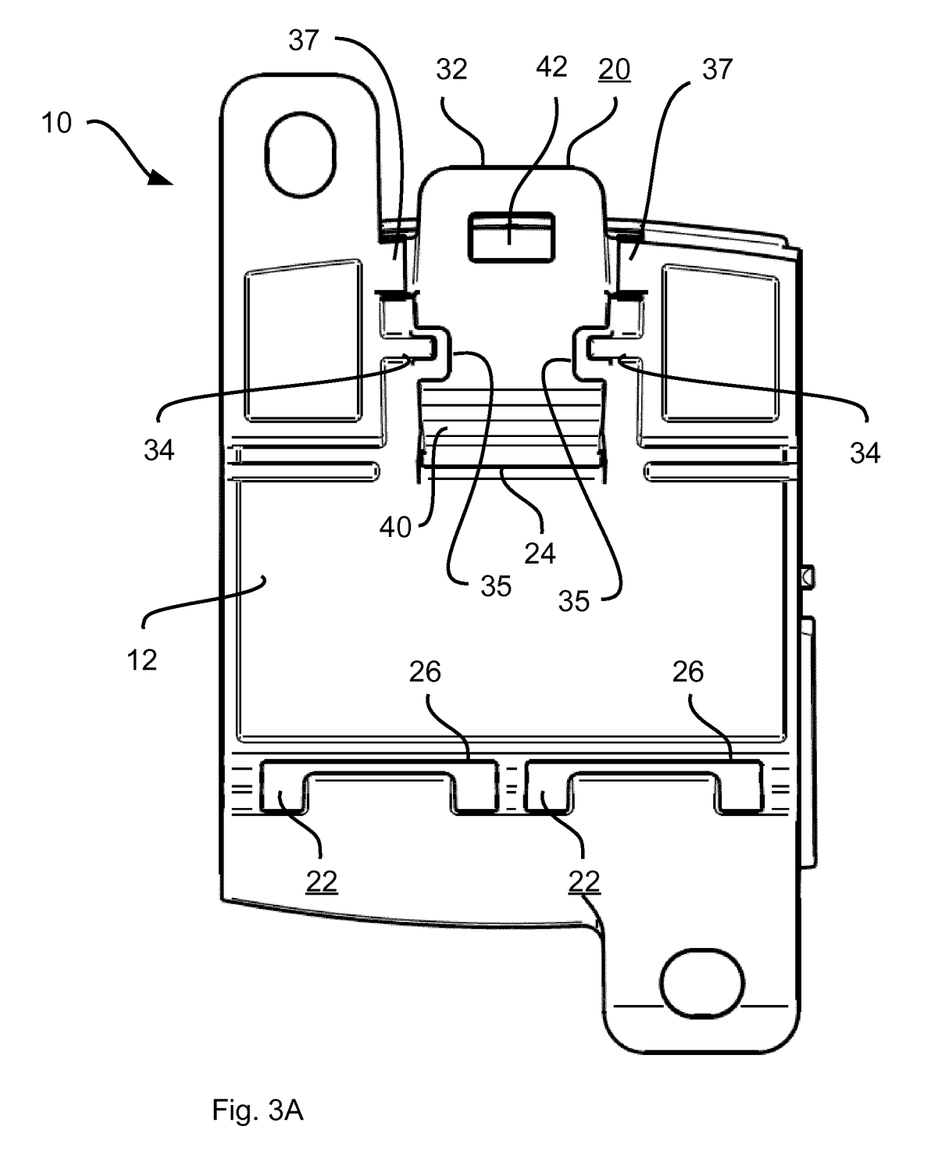
FIGS. 3A, 3B show a bottom side of the assembly according to FIG. 1 and FIG. 2, with a detent profile formed at that location for snapping the assembly onto a support rail.
Figure 3B:
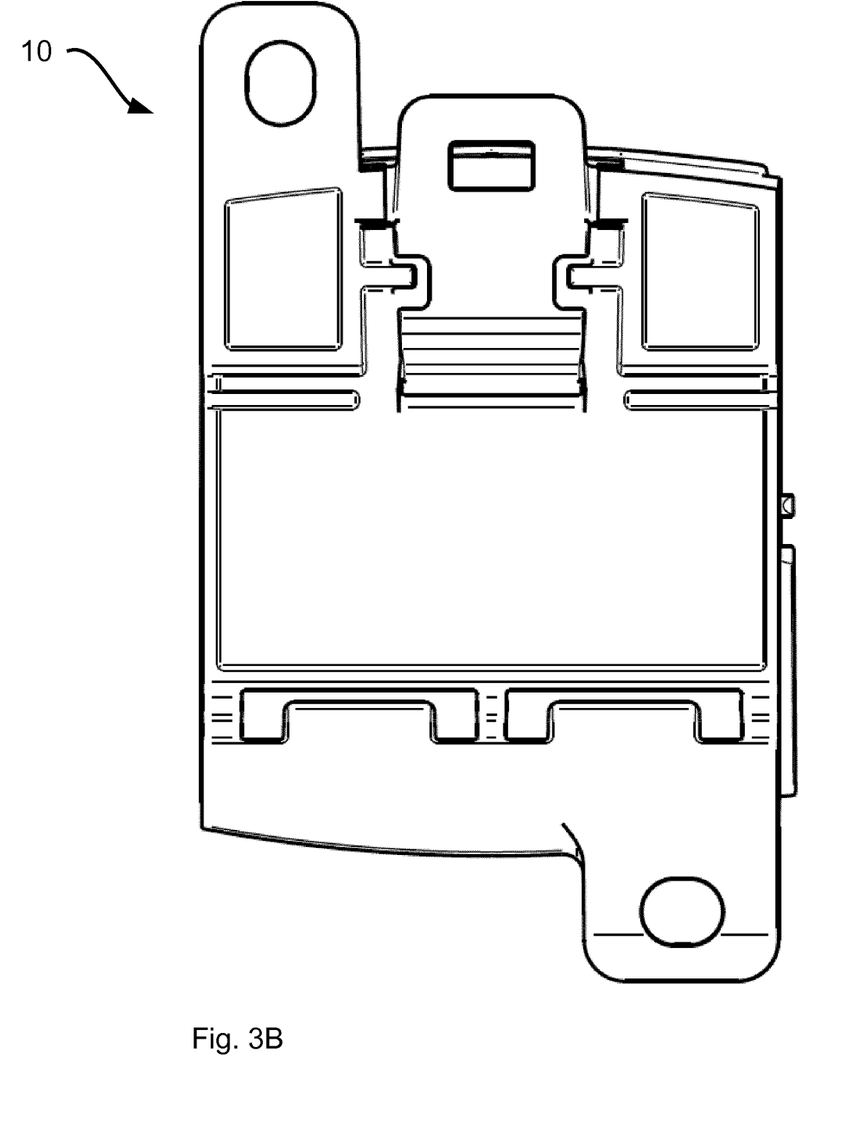
Figure 4A:
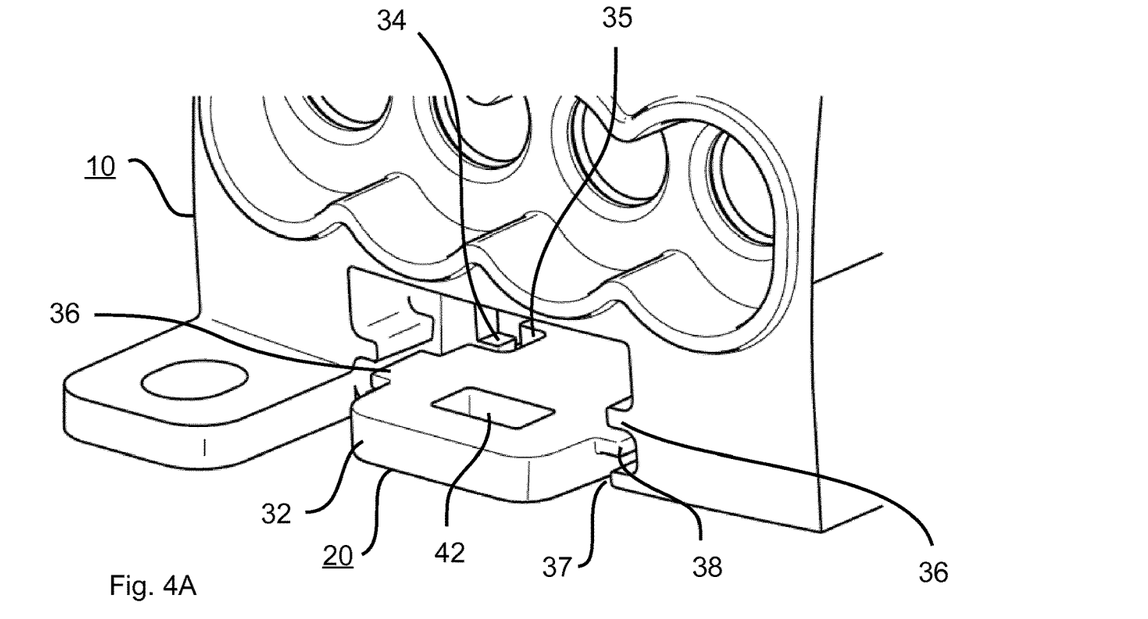
FIGS. 4A, 4B show an enlarged detail from the illustration in FIG. 1, FIGS. 5A, 5B show an enlarged illustration of the bottom side of the assembly in a perspective view.
Figure 4B:
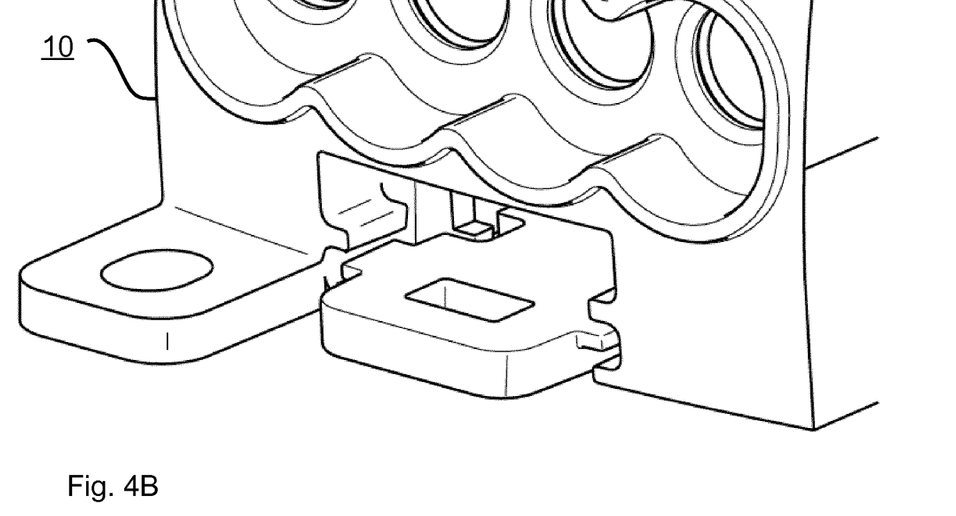
Figure 6:
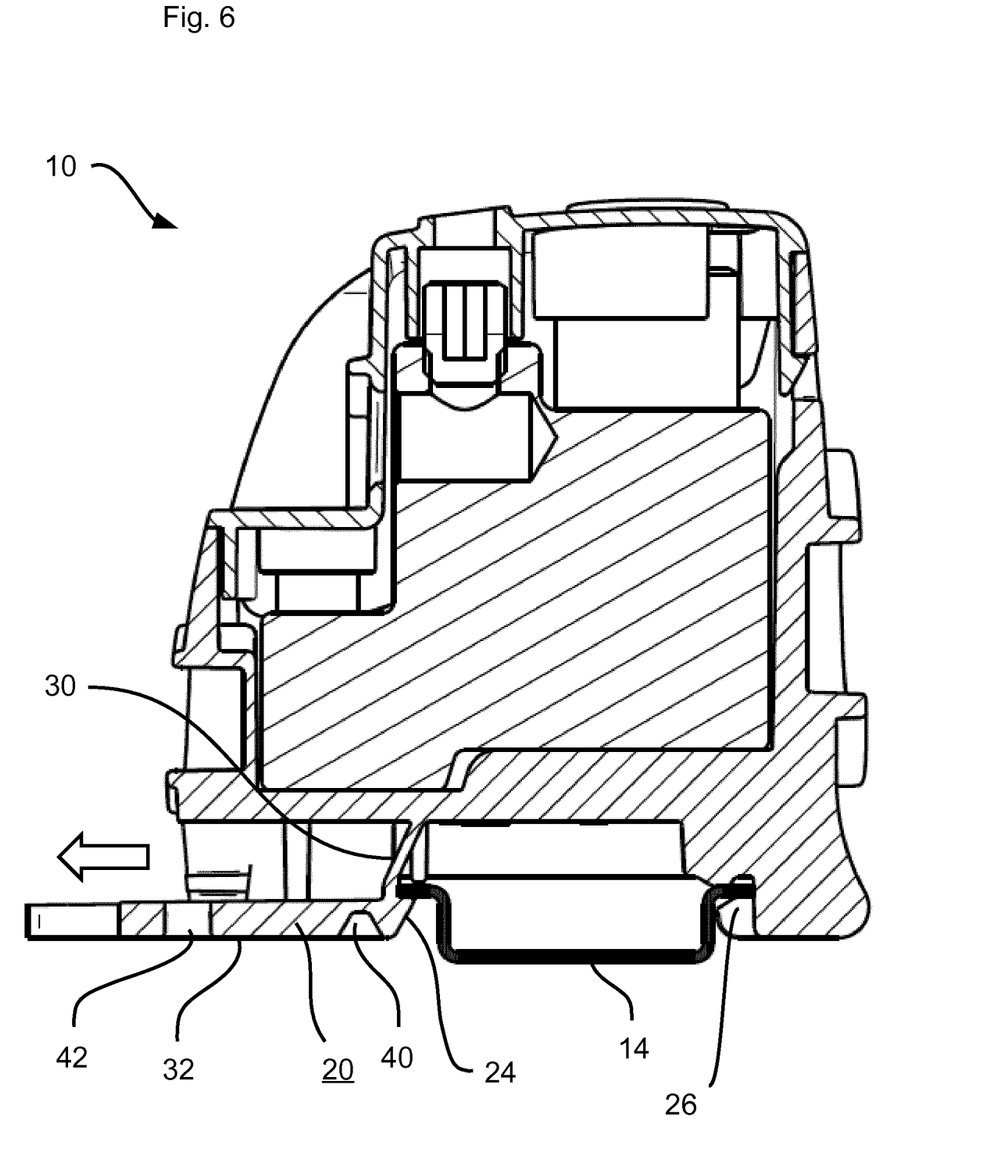
FIG. 6 shows a section through the assembly according to FIG. 1 and FIG. 2 in a side view, in the state in which it is snapped onto a support rail.

The illustrations in FIGS. 3A, 3B show a bottom side 12 of the assembly 10 according to FIG. 1 and FIG. 2. The assembly 10 is provided for snapping onto a support rail 14 (FIG. 6). For this purpose, the bottom side 12 of the assembly 10 has a corresponding design, and has a detent mechanism in the form of at least one movable detent hook 20 and at least one rigid detent hook 22. The movable detent hook 20 and the, or each, rigid detent hook 22 are oppositely placed, facing one another, on the bottom side 12 of the assembly 10. A distance between the movable detent hook 20 and the, or each, rigid detent hook 22 is set to a width of the support rail 14.

The figures show one embodiment of a detent mechanism 20, 22 having one movable detent hook 20 and two rigid detent hooks 22. The following description is continued on this basis, but without prejudice to further universal applicability. Accordingly, an embodiment with more or fewer than two rigid detent hooks 22 or more than one movable detent hook 20 is always to be construed. In principle, for example an embodiment having two movable detent hooks 20 situated opposite from one another may also be considered, which is likewise always to be construed in the following discussion.

In the isometric view of the assembly 10 according to FIG. 1, the movable detent hook 20 is discernible at the base of one of two oppositely situated connection sides of the assembly 10. In the side view shown in FIG. 2, the movable detent hook 20 and a detent lug 24 of the movable detent hook 20, as well as a retaining lug 26 of one of the oppositely situated rigid detent hooks 22, are discernible on one side of the assembly 10. The oppositely situated arrangement of the movable detent hook 20 and the two rigid detent hooks 22 is also clearly apparent in the illustration of the bottom side 12 of the assembly 10. At that location it is also apparent that the detent lug 24 of the movable detent hook 20 and the retaining lugs 26 of the two rigid detent hooks 22 face one another. The support rail 14 is accommodated in the free area that remains in between.

The following discussion deals with the movable detent hook 20 that is included in the detent mechanism 20, 22. To this end, reference is made to the enlarged detail from the illustration in FIG. 1, shown in FIGS. 4A, 4B, and to an enlarged perspective illustration of the bottom side 12 of the assembly 10 in FIGS. 5A, 5B.

Figure 5A:
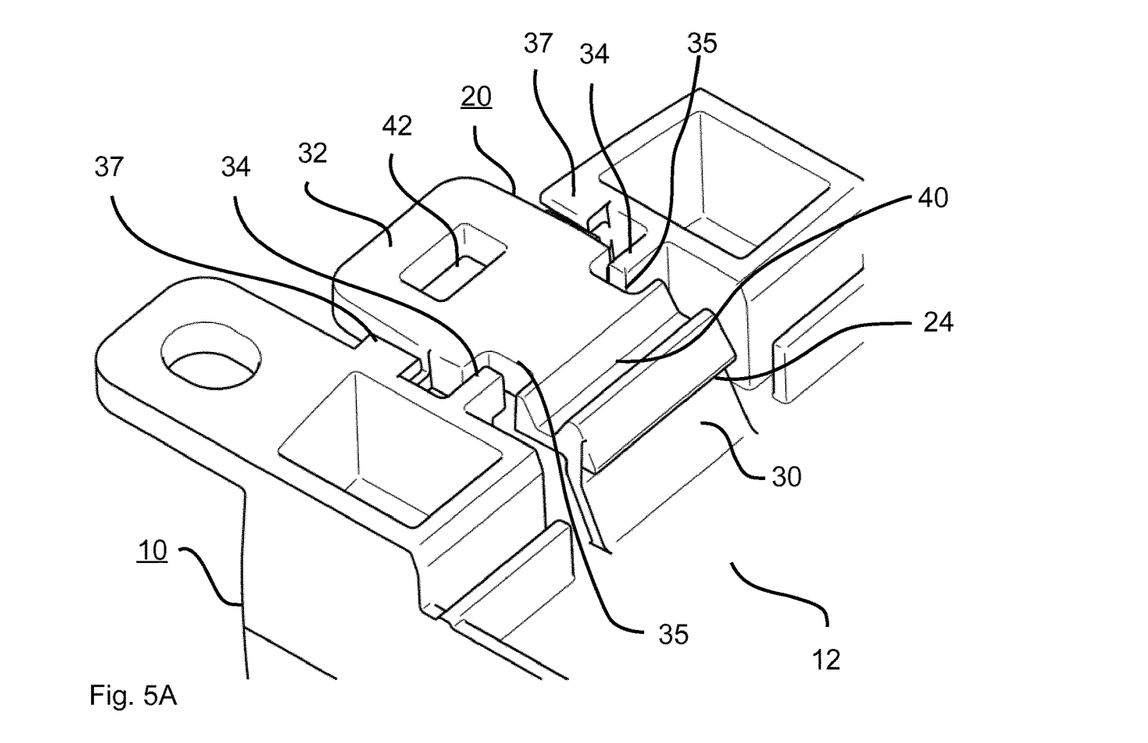
Figure 5B:
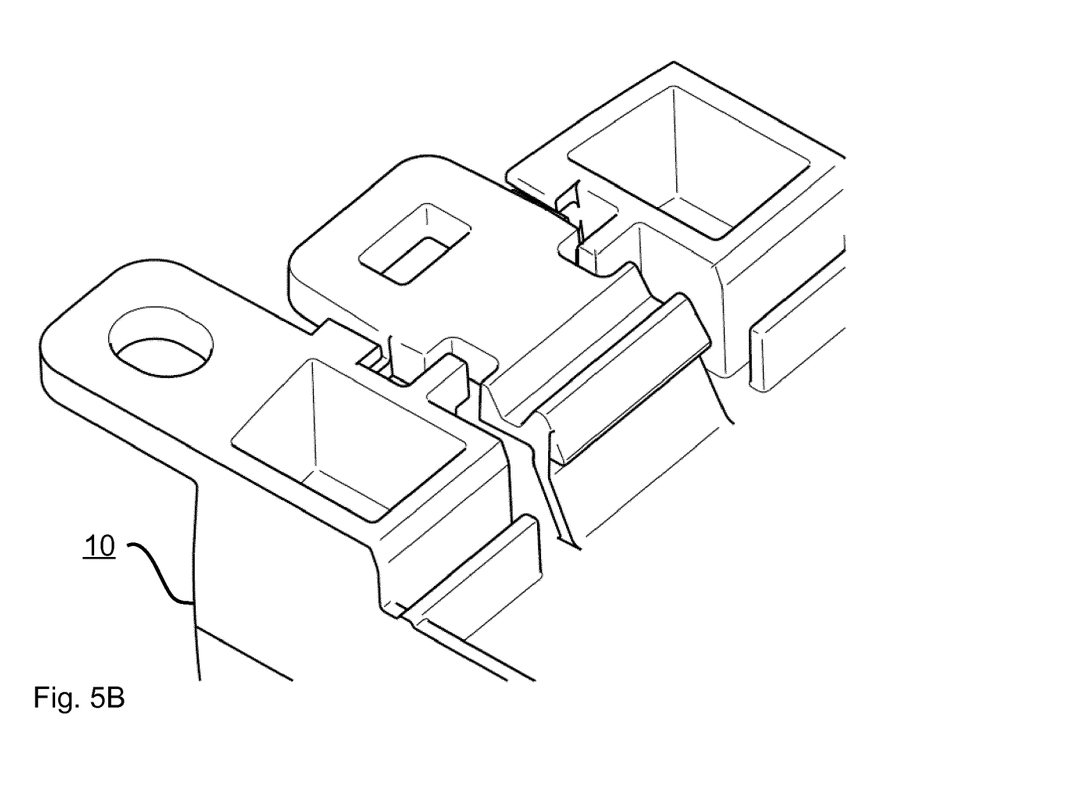

It is clearly apparent in particular in the illustration in FIGS. 5A, 5B that the movable detent hook 20 is hinged to the bottom side 12 of the assembly 10 by means of an elastically movable detent hook web 30. The detent hook web 30 is adjoined by the detent lug 24, which is adjoined by a detent hook bracket 32 that is intended for deflecting the movable detent hook 20.

Limiting means 34, 35, 36, 37, 38 are provided for limiting movability of the detent hook bracket 32 when the movable detent hook 20 is deflected.

In the embodiment of the detent mechanism 20, 22 shown (also see FIG. 3), the limiting means 34-38 are, firstly, at least one stop rib 34 that is oriented transversely with respect to a longitudinal extension of the detent hook bracket. In the embodiment shown, two stop ribs 34 placed opposite from one another are part of a contour of the bottom side 12 of the assembly 10. The detent hook bracket 32 is situated between these stop ribs 34, and has recesses 35 in which the stop ribs 34 engage, so that in each case one of the side faces of these recesses 35 strikes against the stop ribs 34, beginning with a certain deflection of the movable detent hook 20 caused by a movement of the detent hook bracket 32. Further movement of the detent hook bracket 32 is then no longer possible. Accordingly, the movable detent hook 20 also cannot be further deflected. In this regard, the movability of the detent hook bracket 32 limits the possible deflection of the movable detent hook 20 as a whole. As already explained in the general portion of the description, the positions of the stop rib 34 and of the recesses 35 may also be interchanged in the sense of a kinematic reversal in such a way that the detent hook bracket 32 has the stop rib 34, and the contour on the bottom side 12 of the assembly 10 has the recesses 35.

In addition to the limiting means in the form of the stop rib 34 and the recesses 35, the shown embodiment of the detent mechanism 20, 22 includes at least one pair of guide ribs 36, 37 that are placed above and below a plane defined by the detent hook bracket 32. The guide ribs 36, 37 are oriented in parallel to the longitudinal extension of the detent hook bracket 32, and surround a section of the detent hook bracket 32, in the present case a lateral offset 38 on the detent hook bracket 32, likewise oriented in parallel to the longitudinal extension of the detent hook bracket 32. The guide ribs 36, 37 are part of a contour of the bottom side 12 of the assembly 10. As explained above with regard to the stop rib 34 and the recess 35 intended for accommodating the stop rib 34, an association of the offset 38 with the bottom side 12 of the assembly 10 and an association of the guide ribs 36, 37 with the detent hook bracket 32, in the sense of a kinematic reversal, are also possible for the guide ribs 36, 37 that function as limiting means, and optionally for an offset 38. The guide ribs 36, 37 bring about guiding of the detent hook bracket 32 in the plane defined by the position and orientation of the guide ribs 36, 37—in the exemplary embodiment shown, in a plane in parallel to a plane of a mounting plate on which the support rail 14 is mounted, and on which the assembly 10 is in turn snapped on. The guiding of the detent hook bracket 32 in the plane defined by the guide ribs 36, 37 ensures that the detent hook bracket 32, in brief, cannot be bent. This guiding of the detent hook bracket 32 also protects the movable detent hook 20 and its detent hook web 30 from damage.

In the embodiment shown in the figures, the detent hook bracket 32 of the movable detent hook 20 has a material-reduced section 40 between the detent hook 20 on the one hand and the recess 35 that functions as limiting means on the other hand. In the area of the material-reduced section 40, increased elastic deformability of the detent hook bracket 32 results, for example in the manner of a film hinge in principle. Due to this elastic deformability, a purely translational movement of the detent hook bracket 32 between the guide ribs 36, 37 is possible when the movable detent hook 20 is deflected for triggering locking of the assembly 10 to a support rail 14.

The illustration in FIG. 6 shows the assembly 10 according to the figures described above, in a transverse sectional side view and in a state snapped onto a support rail 14 o in the form of a top-hat rail. The profile of the support rail 14 is enclosed, in a manner basically known per se, on the one side by the retaining lugs 26 of the two rigid detent hooks 22, and on the opposite side by the detent lug 24 of the movable detent hook 20. For releasing the locking, the detent hook bracket 32 is moved in the direction indicated by the block arrow. This takes place, for example, by inserting a tool, in particular a blade of a screwdriver (not shown), into an opening 42 at the free end of the detent hook bracket 32. The resulting movement of the detent hook bracket 32 is a purely translational movement due to the guide ribs 36, 37 which function as limiting means.

The translational movement of the detent hook bracket 32 results in pivoting of the movable detent hook 20, so that the detent lug 24 ultimately disengages from the support rail 14, and the locking of the assembly 10 on the support rail 14 is thus released. The translational movability of the detent hook bracket 32 is limited by the stop ribs 34 and the recesses 35 bordering same on the sides of the detent hook bracket 32, so that the extent of deflection of the movable detent hook 20, and thus, the resulting stretching of the material of the detent hook web 30 when the movable detent hook 20 is deflected, is also limited. This protects the movable detent hook 20 even under excessive application of force, so that the detent mechanism 20, 22 thus formed is durable and usable over a long period of time.

Figure 7:
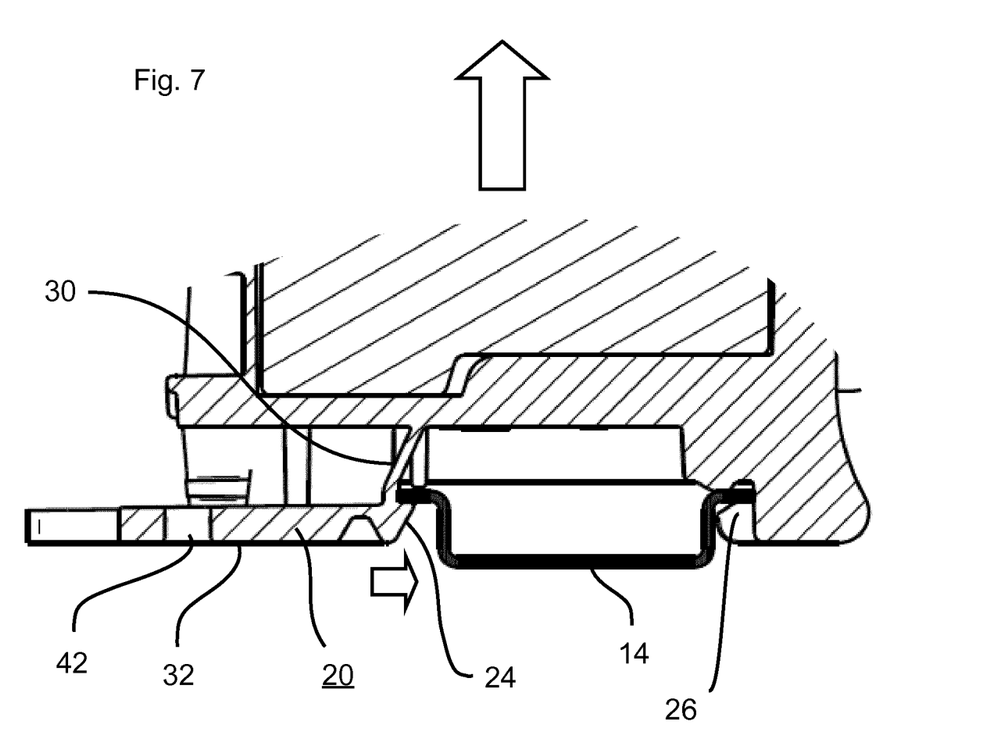
FIG. 7 shows a detail from the illustration in FIG. 6.

The inclination of the detent hook web 30, at least in sections, with respect to a normal to the bottom side 12 of the assembly 10 is also apparent in the illustrations in FIG. 5 and FIG. 6. For a vibration load or tensile load that acts on the assembly 10, this inclination results in the improved load capacity of the detent connection explained in the general portion of the description, as illustrated in the final illustration in FIG. 7. A tensile load (tensile force) acting on the assembly 10, for example due to an improper attempt to release the locking of the assembly 10 on the support rail 14, or due to vibration loads or the like, is depicted in the illustration in FIG. 7 by the upwardly pointing block arrow. The detent hook web 30 is increasingly raised from its inclined position into a vertical position due to such a tensile load. As a result, the detent hook web 30 and the detent lug 24 situated on its end are pressed even more strongly against the adjoining structure of the support rail 14. This pressing against the support rail 14 is explainable as the result of a resolution of a retaining force that acts against the tensile force and corresponds in magnitude to the tensile force: The direction of the retaining force and the detent hook web 30 enclose an angle due to the inclined position of the detent hook web 30. Accordingly, the retaining force may be represented as being composed of a first and a second force component. The first force component acts along the longitudinal extension of the inclined detent hook web 30. The second force component complements the first force component in a force parallelogram, according to the magnitude and direction of the overall acting retaining force. This second force component causes the detent hook web 30 to press against the support rail 14, and the detent lug 24 to "dig in" on the bottom side of the support rail 14. This is shown by the block arrow pointing to the right in the area of the detent lug 24.

The description provided herein may thus be briefly summarized as follows: A detent mechanism 20, 22 for an electrical assembly 10 is provided, wherein the detent mechanism 20, 22 comprises a movable detent hook 20 that is hinged to the assembly 10 by means of an elastically movable detent hook web 30, and a detent hook bracket 32 that is intended for deflecting the detent hook 20, and wherein limiting means 34, 35, 36, 37, 38 limit movability of the detent hook bracket 32 when the detent hook 20 is deflected.

LIST OF REFERENCE NUMERALS 10 electrical assembly
12 bottom side
14 support rail 16, 18 (not used)
20 detent mechanism, movable detent hook
22 detent mechanism, rigid detent hook
24 detent lug
26 retaining lug
28 (not used)
30 detent hook web
32 detent hook bracket
34 limiting means, stop rib
35 limiting means, recess
36 limiting means, (upper) guide rib
37 limiting means, (lower) guide rib
38 limiting means, offset
40 material-reduced section
42 opening

The invention claimed is:

1. A detent mechanism (20, 22) for an electrical assembly (10), wherein the detent mechanism (20, 22) comprises:
a detent hook (20) that is hinged to the assembly (10) by means of an elastically movable detent hook web (30), wherein the detent hook (20) comprises a detent hook bracket (32) that is intended for deflecting the detent hook (20); and
a limiting mechanism (34, 35, 36, 37, 38) limiting extent of movement of the detent hook bracket (32), comprising a part (35, 38) of the detent hook (20) engaging a part (34, 36, 37) of the assembly (10) when the detent hook (20) is deflected,
wherein the detent hook web (30) is inclined, at least in sections, with respect to a normal, wherein the detent hook bracket (32) has a material-reduced section (40), and wherein the material-reduced section (40) of the detent hook bracket (32) is situated between the detent hook (20) and the limiting mechanism (34, 35, 36, 37, 38).

2. The detent mechanism (20, 22) according to claim 1, wherein the limiting mechanism comprises at least one stop rib (34) that is oriented transversely with respect to a longitudinal extension of the detent hook bracket (32).

3. The detent mechanism (20, 22) according to claim 2, wherein the limiting mechanism further comprises at least one pair of guide ribs (36, 37) that are placed above and below a plane defined by the detent hook bracket (32).

4. An electrical assembly (10) having the detent mechanism (20, 22) according to claim 3.

5. An electrical assembly (10) having the detent mechanism (22, 22) according to claim 2.

6. The detent mechanism (20, 22) according to claim 1, wherein the limiting mechanism comprises at least one pair of guide ribs (36, 37) that are placed above and below a plane defined by the detent hook bracket (32).

7. An electrical assembly (10) having the detent mechanism (20, 22) according to claim 6.

8. An electrical assembly (10) having the detent mechanism (20, 22) according to claim 1.

9. The detent mechanism (20, 22) according to claim 1, wherein the limiting mechanism (34, 35, 36, 37, 38) comprises a first limiting structure (35, 38) corresponding to the part (35, 38) of the detent hook (20) engaging a second limiting structure (34, 36, 37) corresponding to the part (35, 38) of the assembly (10) when the detent hook (20) is deflected.

10. The detent mechanism (20, 22) according to claim 1, wherein the limiting mechanism (34, 35, 36, 37, 38) comprises a first limiting structure (35, 38) and a second limiting structure (34, 36, 27) engaging each other to limit extent of movement of the detent hook bracket (32), wherein the detent hook (20) comprises the first limiting structure (35, 38) and the assembly (10) comprises the second limiting structure (34, 36, 37), and wherein the first limiting structure engages the second limiting structure (34, 36, 37) when the detent hook (20) is deflected thereby limiting the extent of movement of the detent hook bracket (32).

11. The detent mechanism (20, 22) according to claim 1, wherein the part (35, 38) of the detent hook (20) comprised in the limiting mechanism (34, 35, 36, 37, 38) and the part (34, 36, 37) comprised in the assembly (10) are structured and positioned relative to each other such that the part (35, 38) of the detent hook (20) engages the part (34, 36, 37) of the assembly (10) when the detent hook (20) is deflected, thereby limiting extent of movement of the detent hook bracket (32).

* * * * *